United States Patent
Arroyo et al.

(10) Patent No.: US 8,553,690 B2
(45) Date of Patent: Oct. 8, 2013

(54) PROCESSING MULTICAST MESSAGES IN A DATA PROCESSING SYSTEM

(75) Inventors: Jesse P. Arroyo, Rochester, MN (US); Timothy R. Block, Rochester, MN (US); Leonardo Letourneaut, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/968,580

(22) Filed: Dec. 15, 2010

(65) Prior Publication Data

US 2012/0155462 A1   Jun. 21, 2012

(51) Int. Cl.
*H04L 12/28* (2006.01)

(52) U.S. Cl.
USPC ............ 370/390; 370/254; 370/255; 370/382

(58) Field of Classification Search
USPC .......................................................... 370/390
See application file for complete search history.

(56) References Cited

U.S. PATENT DOCUMENTS

| | | | |
|---|---|---|---|
| 6,275,867 B1 * | 8/2001 | Bendert et al. ................. | 719/316 |
| 6,765,892 B1 | 7/2004 | Leung et al. | |
| 7,327,731 B1 * | 2/2008 | Kumar et al. ................. | 370/390 |
| 7,400,596 B1 | 7/2008 | Robertson et al. | |
| 7,428,598 B2 * | 9/2008 | Arndt et al. ................... | 709/250 |
| 7,583,665 B1 | 9/2009 | Duncan et al. | |
| 7,856,019 B2 * | 12/2010 | Shah et al. ..................... | 370/390 |
| 7,899,050 B2 * | 3/2011 | Craddock et al. ............. | 370/390 |
| 7,961,729 B2 * | 6/2011 | Gainey et al. ................. | 370/390 |
| 8,289,883 B2 * | 10/2012 | Zhu et al. ....................... | 370/255 |
| 2008/0205297 A1 * | 8/2008 | Kimura et al. ................ | 370/254 |
| 2009/0245248 A1 | 10/2009 | Arberg et al. | |

* cited by examiner

*Primary Examiner* — Ian N Moore
*Assistant Examiner* — Lakebram Jangbahadur
(74) *Attorney, Agent, or Firm* — Biggers & Ohanian, LLP

(57) ABSTRACT

Processing multicast messages in a data processing system that includes compute nodes, each of which includes a communications controller, the communications controllers operatively coupled for data communications amongst the compute nodes, each compute node in the data processing system executing at least one logical partition, the data processing system including a hypervisor, where multicast messages are processed by receiving, by more than one of the communications controllers, a multicast message; responsive to receipt of the multicast message, signaling, by one of the communications controllers, an interrupt in the hypervisor without signaling an interrupt by any other communications controller; determining, by the hypervisor, that the message received by the interrupt signaling communications controller is a multicast message; and providing, by the hypervisor, the multicast message to at least one logical partition configured to receive multicast messages.

16 Claims, 6 Drawing Sheets

PROCESSING MULTICAST MESSAGES IN A DATA PROCESSING SYSTEM

STATEMENT REGARDING FEDERALLY SPONSORED RESEARCH OR DEVELOPMENT

This invention was made with Government support under Contract No. HR0011-07-9-0002 awarded by the Department of Defense. The Government has certain rights in this invention.

BACKGROUND OF THE INVENTION

1. Field of the Invention

The field of the invention is data processing, or, more specifically, methods, apparatus, and products for processing multicast messages in a data processing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Some computer systems today are made up of many individual sub-systems, operating together to form a single data processing system. In such data processing systems, data communications among the sub-systems and with other data processing systems presents various challenges. Multicast messages, for example, transmitted from one source to many recipients are often challenging to efficiently process.

SUMMARY OF THE INVENTION

Methods, apparatus, and products for processing multicast messages in a data processing system are disclosed. The data processing system includes a plurality of compute nodes with each compute node including a communications controller. The communications controllers are operatively coupled for data communications amongst the compute nodes of the data processing system. Each compute node in the data processing system also executes at least one logical partition. The data processing system also includes a hypervisor that adapts communications controllers of the compute nodes to logical partitions for multicast communications. In such a data processing system, processing multicast messages in accordance with embodiments of the present invention includes receiving, by more than one of the communications controllers, a multicast message; responsive to receipt of the multicast message, signaling, by one of the communications controllers, an interrupt in the hypervisor without signaling an interrupt by any other communications controller; determining, by the hypervisor, that the message received by the interrupt signaling communications controller is a multicast message; and providing, by the hypervisor, the multicast message to at least one logical partition configured to receive multicast messages.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
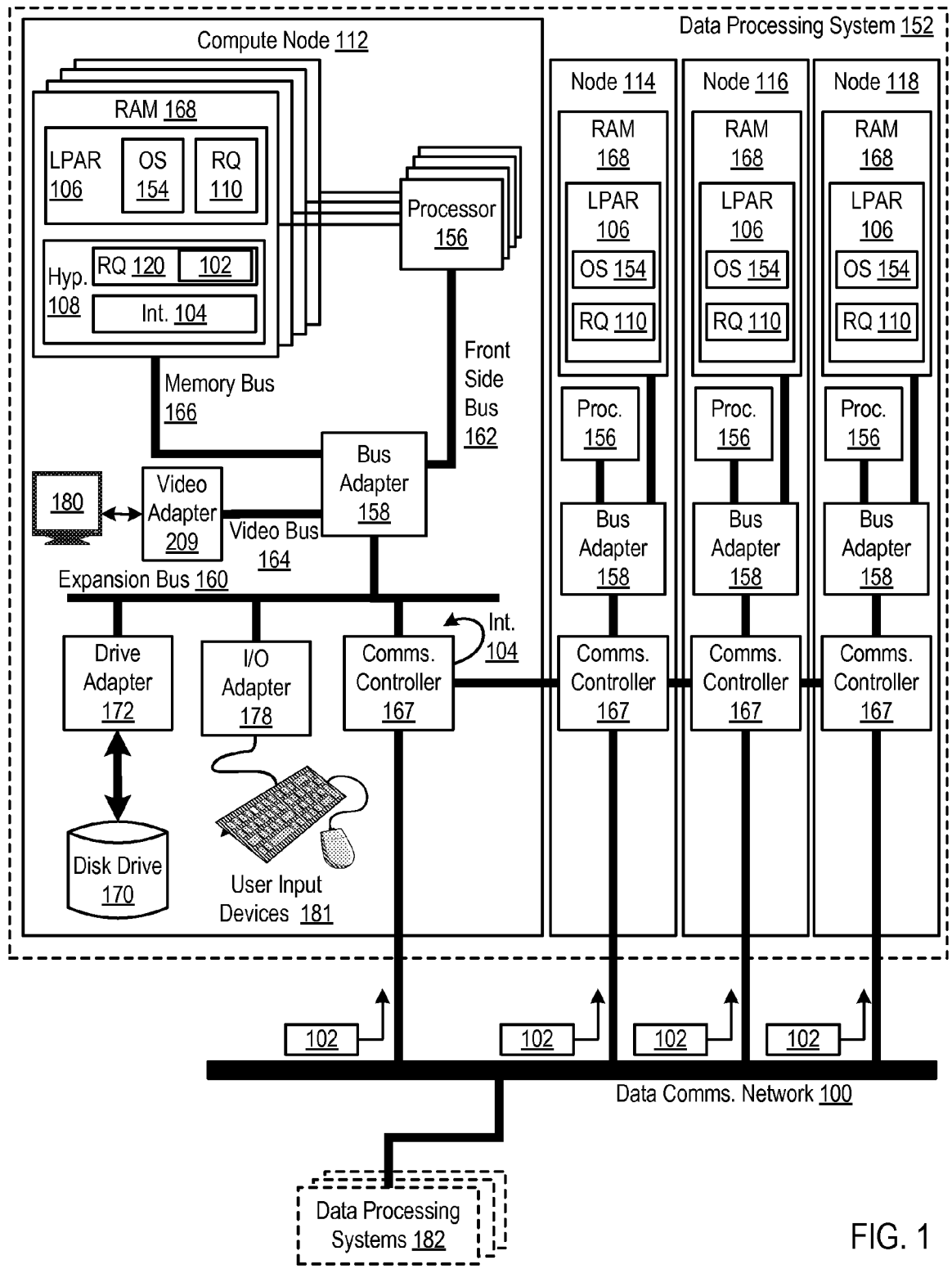
FIG. 1 sets forth a network diagram of a system for processing multicast messages in a data processing system according to embodiments of the present invention.

Exemplary methods, apparatus, and products for processing multicast messages in a data processing system in accordance with the present invention are described with reference to the accompanying drawings, beginning with FIG. 1. FIG. 1 sets forth a network diagram of a system for processing multicast messages in a data processing system according to embodiments of the present invention. The system of FIG. 1 includes an example of automated computing machinery comprising an exemplary data processing system (152) useful in processing multicast messages according to embodiments of the present invention. The data processing system (152) of FIG. 1 includes a plurality of compute nodes (112, 114, 116, and 118).

Each compute node may be implemented as automated computing machinery—a computer configured to operate with compute nodes as a single computing system—the data processing system (152) in the example of FIG. 1. Each compute node (112, 114, 116, and 118) in the example of FIG. 1 includes at least one computer processor (156) or 'CPU' as well as random access memory (168) ('RAM') which is connected through a high speed memory bus (166) and bus adapter (158) to a processor (156) and to other components of the computer (152). The compute node (112) of FIG. 1, for example, includes multiple processors (156). Such processors may include any number of processing cores. Each processor (156) is coupled to RAM (168) in two ways—through a bus adapter (158) and memory bus (166), and through a direct connection.

Each compute node (112, 114, 116, and 118) in the example system of FIG. 1 also includes a communications controller (167). The communications controllers (167) are operatively coupled for data communications amongst the compute nodes of the data processing system. In the example of FIG. 1, each of the communications controllers (167) are directly coupled to one another. The communications controllers (167) also couple for data communications the data processing system (152) to other data processing systems (182) through a data communications network (102). Such data communications may be carried out serially through RS-232 connections, through external buses such as a Universal Serial Bus ('USB'), through data communications networks such as IP data communications networks, and in other ways as will occur to those of skill in the art. Communications controllers implement the hardware level of data communications through which one computing device sends data communications to another computing device, directly or through a data communications network. Examples of communications controllers useful for processing multicast messages in a data processing system according to embodiments of the present invention include modems for wired dial-up communications, Ethernet (IEEE 802.3) adapters for wired data communications network communications, and 802.11 adapters for wireless data communications network communications.

Stored in RAM (168) of each compute node (112, 114, 116, and 118) in the data processing system is at least one logical partition (106) executing on the compute node (112, 114, 116, and 118). A logical partition, commonly referred to as an LPAR, is a subset of computer's hardware resources, virtualized in software as a separate computer. In effect, a physical machine can be partitioned into multiple logical partitions, each hosting a separate operating system (154). An operating system is a computer software component that is responsible for execution of applications programs and for administration of access to computer resources, memory, processor time, and I/O functions, on behalf of application programs. Operating systems useful processing multicast messages in a data processing system according to embodiments of the present invention include UNIX™, Linux™, Microsoft XP™, AIX™, IBM's i5/OS™, and others as will occur to those of skill in the art.

The data processing system (152) of FIG. 1 also includes a hypervisor that adapts the communications controllers (167) of the compute nodes (112, 114, 116, and 118) to logical partitions (106) for multicast communications. A hypervisor, as the term is used here refers to a module of automated computing machinery comprising an aggregation of computer hardware and software that virtualizes computer hardware. There are generally two types of hypervisors: Native, or 'bare metal,' hypervisors that run directly on a host's hardware to control the hardware and to monitor guest operating systems; or hosted hypervisors that run within a conventional operating system environment. The hypervisor in the example of FIG. 1 is a native hypervisor that runs directly on the host hardware, and provides support for the LPARs (106). Processor capacity is provided to the LPARs by the hypervisor in either a dedicated fashion or on an entitlement basis where unused capacity is harvested and may be re-allocated to busy workloads. Groups of LPARs can have their processor capacity managed as if they were in a 'pool.' The hypervisor may allocate memory to each LPAR.

Processing multicast messages in the data processing system (152) in accordance with embodiments the present invention includes receiving, by more than one of the communications controllers (167), a multicast message (102). A multicast message (102) is a data communications message transmitted from a single source to a group of recipients, where the group includes a plurality of recipients. The group of recipients in some instances may include all possible recipients. In such an embodiment, a multicast message is effectively a broadcast message a message sent from a single source to all possible recipients.

In the method of FIG. 1, each of the communications controllers (167) in the data processing system receives the same multicast message (102) from a source, such as another data processing system (182), through the data communications network (100). In prior art embodiments of a multi-node data processing system, each communications controller (167), upon recipient of such a message will each, separately, raise an interrupt. Each interrupt will then be processed by the hypervisor (108) separately. Effectively, a single message received by multiple communications controllers in prior art data processing systems, causes multiple interrupts in the hypervisor. By contrast, in the method of FIG. 1, responsive to receipt of the multicast message (102) one of the communications controllers (167) signals an interrupt (104) in the hypervisor (108), without any by any other communications controller (167) signaling an interrupt.

The hypervisor (108) in the example of FIG. 1 continues processing the multicast message (102) in accordance with embodiments of the present invention, responsive to the interrupt, by determining that the message received by the interrupt signaling communications controller (167) is a multicast message and providing the multicast message (102) to at least one logical partition (106) configured to receive multicast messages. A logical partition is said to be 'configured to receive multicast messages' in that the logical partition has registered, with the hypervisor (108), a receive queue (110) designated for the purpose of storing received multicast messages. The hypervisor (108) likewise includes a receive queue (120) in which the hypervisor stores messages while determining whether the message is a multicast message. The hypervisor then, responsive to an interrupt, inspects a message header of a message in the receive queue (120), determines that the message is a multicast message and provides the message to one or more LPARs with registered receive queues. In this way, a single interrupt by one compute node (112) enables multicast message processing by the hypervisor (108).

Although the logical partitions (106), the operating systems (154), and the hypervisor (108), in the example of FIG. 1 are shown in RAM (168), many components of such software may also be stored in non-volatile memory, such as, for example, on a disk drive (170). The compute node (112) of FIG. 1 includes disk drive adapter (172) coupled through expansion bus (160) and bus adapter (158) to processors (156) and other components of the compute node (112). Disk drive adapter (172) connects non-volatile data storage to the compute node (112) and thus to the data processing system (112) in the form of disk drive (170). Disk drive adapters useful in data processing systems that process multicast messages according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example compute node (112) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example compute node (112) of FIG. 1 includes a video adapter (209), which is an example of an I/O adapter specially designed for graphic output to a display device (180) such as a display screen or computer monitor. Video adapter (209) is connected to the processors (156) through a high speed video bus (164), bus adapter (158), and the front side bus (162), which is also a high speed bus.

The data processing system (152) of FIG. 1 includes four compute nodes for purposes of explanation, not limitation. Data processing systems (152) useful for processing multicast messages in accordance with embodiments of the present invention may include any number of compute nodes. In a similar manner, compute node (112), an no other compute node, is depicted in the example of FIG. 1 to include a video adapter (209), and I/O adapter (178), a disk drive (170), and so on for clarity of explanation, not limitation. Readers of skill in the art will immediately recognize that any compute node useful in data processing systems in which multicast messages are processed in accordance with embodiments of the present invention may include more or less components than those depicted in the example system of FIG. 1, provided that at least one compute node in a data processing system executes a hypervisor, each compute node is capable of executing an LPAR, and each compute node includes a communications controller configured for processing multicast messages in accordance with embodiments of the present invention.

The arrangement of data processing systems (152), compute nodes (112, 114, 115, and 118), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
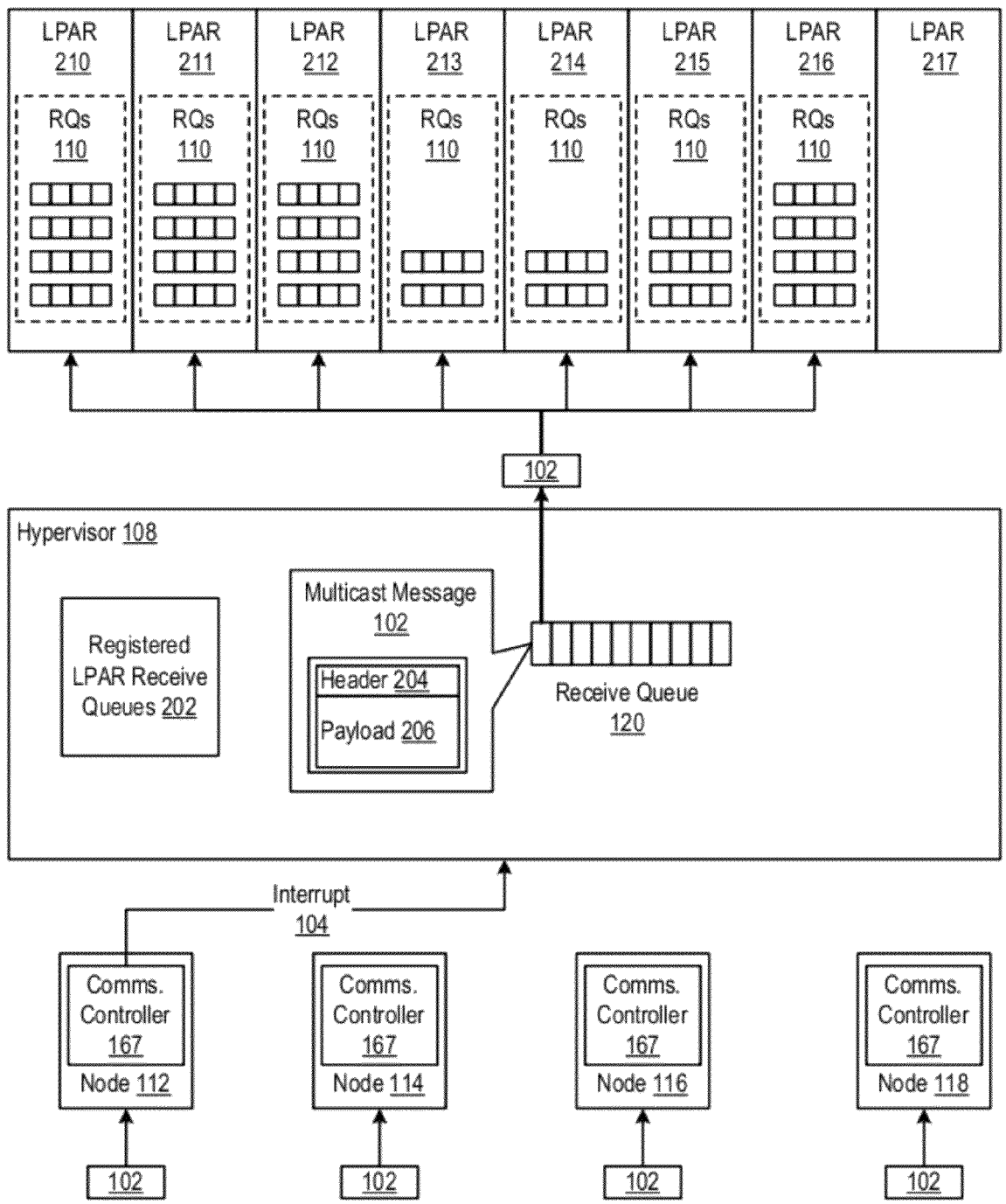
FIG. 2 sets forth a functional block diagram of an exemplary system for processing multicast messages in a data processing system according to embodiments of the present invention.

For further explanation, FIG. 2 sets forth a functional block diagram of an exemplary system for processing multicast messages in a data processing system according to embodiments of the present invention. The system of FIG. 2 includes a plurality of compute nodes (112, 114, 116, and 118), with each compute node including a communications controller (167). The communications controllers (167) are operatively coupled for data communications amongst the compute nodes (112, 114, 116, and 118). Each compute node (112, 114, 116 and 118) executes at least one logical partition (210-217). In the example of FIG. 2, four compute nodes (112, 114, 116, and 118) combine to execute eight logical partitions (210-217).

The example system of FIG. 2 also includes a hypervisor (108) that adapts the communications controllers (167) of the compute nodes to logical partitions for multicast communications. The hypervisor (108) is said to adapt the communications controllers to logical partitions for multicast communications in that the hypervisor is configured to effectively forward multicast messages to logical partitions.

In the example system of FIG. 2, each of the communications controllers (167) receives a multicast message (102). Responsive to receipt of the multicast message (102), one communications controller (167)—the communications controller (167) of compute node (112)—signals an interrupt (104) in the hypervisor (108) without any other communications controller (167) signaling such an interrupt. As part of interrupting the hypervisor the interrupting communications controller (167) may also provide a pointer, a memory address, to the hypervisor of the multicast message (102).

The hypervisor (108), upon the interrupt (104), may copy the message (102) to local storage in the receive queue (120) and determine whether the message (102) is a multicast message. The message (102) includes a header (204) and payload (206). Included in the header is a field specifying the type of the message (102). The hypervisor (108) may inspect the message header to determine the type of the message (102). Once the hypervisor (108) determines that the message (102) is a multicast message the hypervisor, using a data structure specifying receive queues of logical partitions registered for receipt of multicast messages, may provide the multicast message (102) to at least one logical partition (210-217) configured to receive multicast messages. In the example of FIG. 2, one logical partition (217) has registered no receive queues for receipt of multicast messages, while other logical partitions have registered different numbers of receive queues (210).

Figure 3:
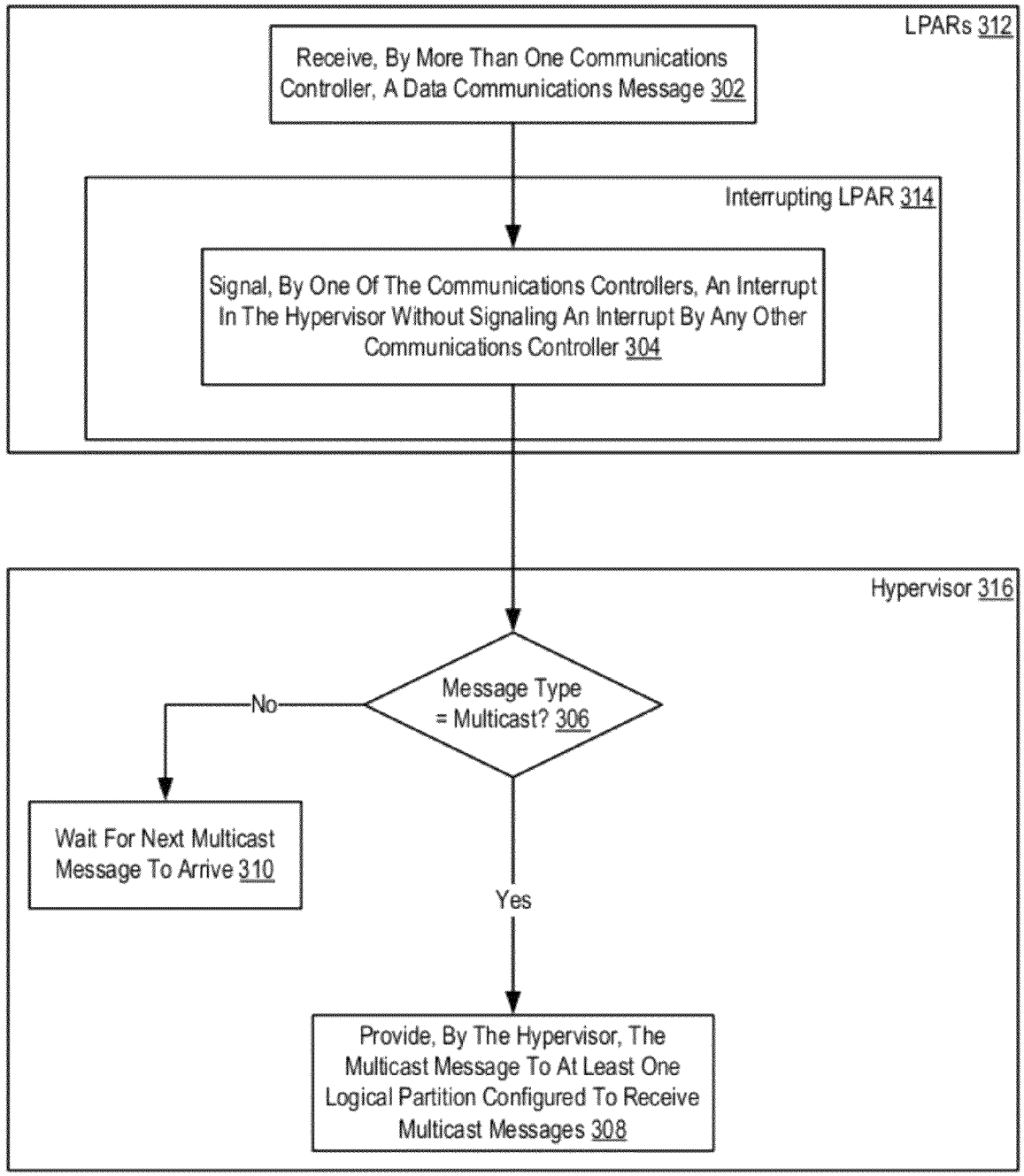
FIG. 3 sets forth a flow chart illustrating an exemplary method for processing multicast messages in a data processing system according to embodiments of the present invention.

For further explanation, FIG. 3 sets forth a flow chart illustrating an exemplary method for processing multicast messages in a data processing system according to embodiments of the present invention. The method of FIG. 3 is carried out in a data processing system similar to the data processing system (152) depicted in FIG. 1. The data processing system includes a plurality of compute nodes (112, 114, 116, and 118 on FIG. 1), with each compute node including a communications controller (167 on FIG. 1), where the communications controllers (167) are operatively coupled for data communications amongst the compute nodes of the data processing system, and each compute node in the data processing system executes at least one logical partition (312). The data processing system also includes a hypervisor (316) that adapts communications controllers of the compute nodes to logical partitions (312) for multicast communications.

The method of FIG. 3 includes receiving (302), by more than one of the communications controllers, a multicast message. Receiving (302), by more than one of the communications controllers, a multicast message may be carried out by receiving an internet protocol ('IP') data communications message through a data communications network and storing the message in local memory of the communications controller or in memory remote to the communications controller but designated for such purpose.

Responsive to receipt of the multicast message, the method of FIG. 3 continues by signaling (304), by one of the communications controllers, an interrupt in the hypervisor without signaling an interrupt by any other communications controller. Signaling an interrupt in a hypervisor may be carried out in various ways including, for example, by raising a hardware level interrupt in the processor designated for such purpose, by storing a predefined value at a predefined memory location designated for such purpose, and in other ways as will occur to readers of skill in the art.

The method of FIG. 3 also includes determining (306), by the hypervisor (316), whether the message received by the interrupt signaling communications controller (314) is a multicast message. Determining (306) whether the message is a multicast message may be carried out by inspecting a header of the message and identifying in the message header a multicast message type.

If the message is a multicast message, the method of FIG. 3 continues by providing (308), by the hypervisor (316), the multicast message to at least one logical partition (312) configured to receive multicast messages. Providing (308) the multicast message to at least one logical partition (312) configured to receive multicast messages may be carried out in various ways including, for example, by storing, in a receive queue of the logical partition, a memory address at which the message is stored.

If the message is not a multicast message, the method of FIG. 3 continues by waiting (310) for the next multicast message to arrive. The hypervisor (316), for example, may drop the current message and return from the interrupt.

Figure 4:
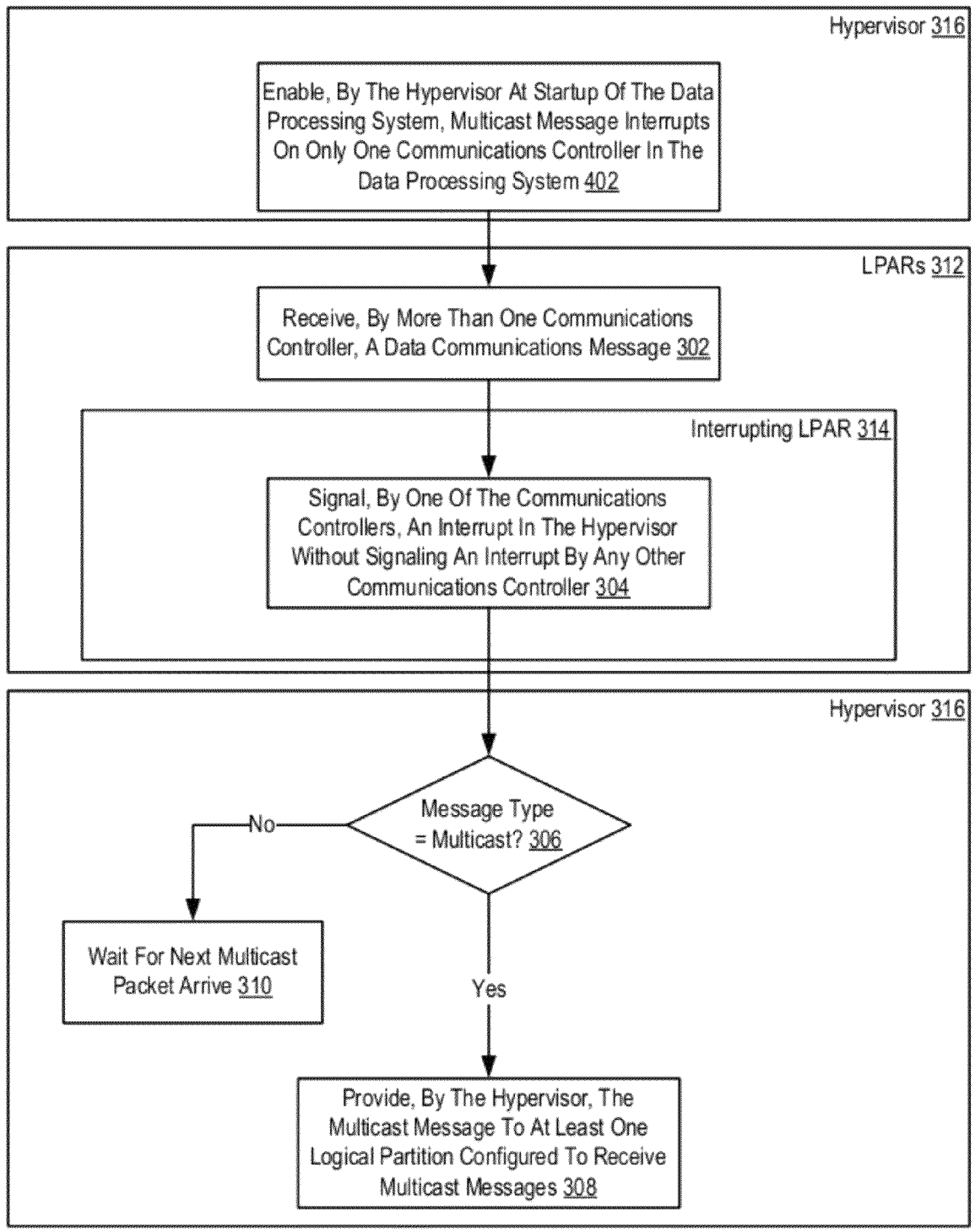
FIG. 4 sets forth a flow chart illustrating a further exemplary method for processing multicast messages in a data processing system according to embodiments of the present invention.

For further explanation, FIG. 4 sets forth a flow chart illustrating a further exemplary method for processing multicast messages in a data processing system according to embodiments of the present invention. The method of FIG. 4 is similar to the method of FIG. 3 in that the method of FIG. 4 also includes: receiving (302), by more than one of the communications controllers, a multicast message; responsive to receipt of the multicast message, signaling (304), by one of the communications controllers, an interrupt in the hypervisor without signaling an interrupt by any other communications controller; determining (306), by the hypervisor, that the message received by the interrupt signaling communications controller is a multicast message; and providing (308), by the hypervisor, the multicast message to at least one logical partition configured to receive multicast messages.

The method of FIG. 4 differs from the method of FIG. 3, however, in that the method of FIG. 4 includes enabling (402), by the hypervisor (402) at startup of the data processing system, multicast message interrupts on only one communications controller in the data processing system. Enabling (402) multicast message interrupts on only one communications controller in the data processing system may be carried out in various ways including, by storing a predefined value in a predefined memory location accessible by the communications controller. If the predefined value is present, the communications controller is configured signal interrupts. Enabling (402) multicast message interrupts on only one communications controller in the data processing system may also be carried out through a handshake procedure, that, upon startup, each communications controller requests from the hypervisor permission to signal interrupts. The hypervisor in such an embodiment, may deny permission to all but one communications controller.

Figure 5:
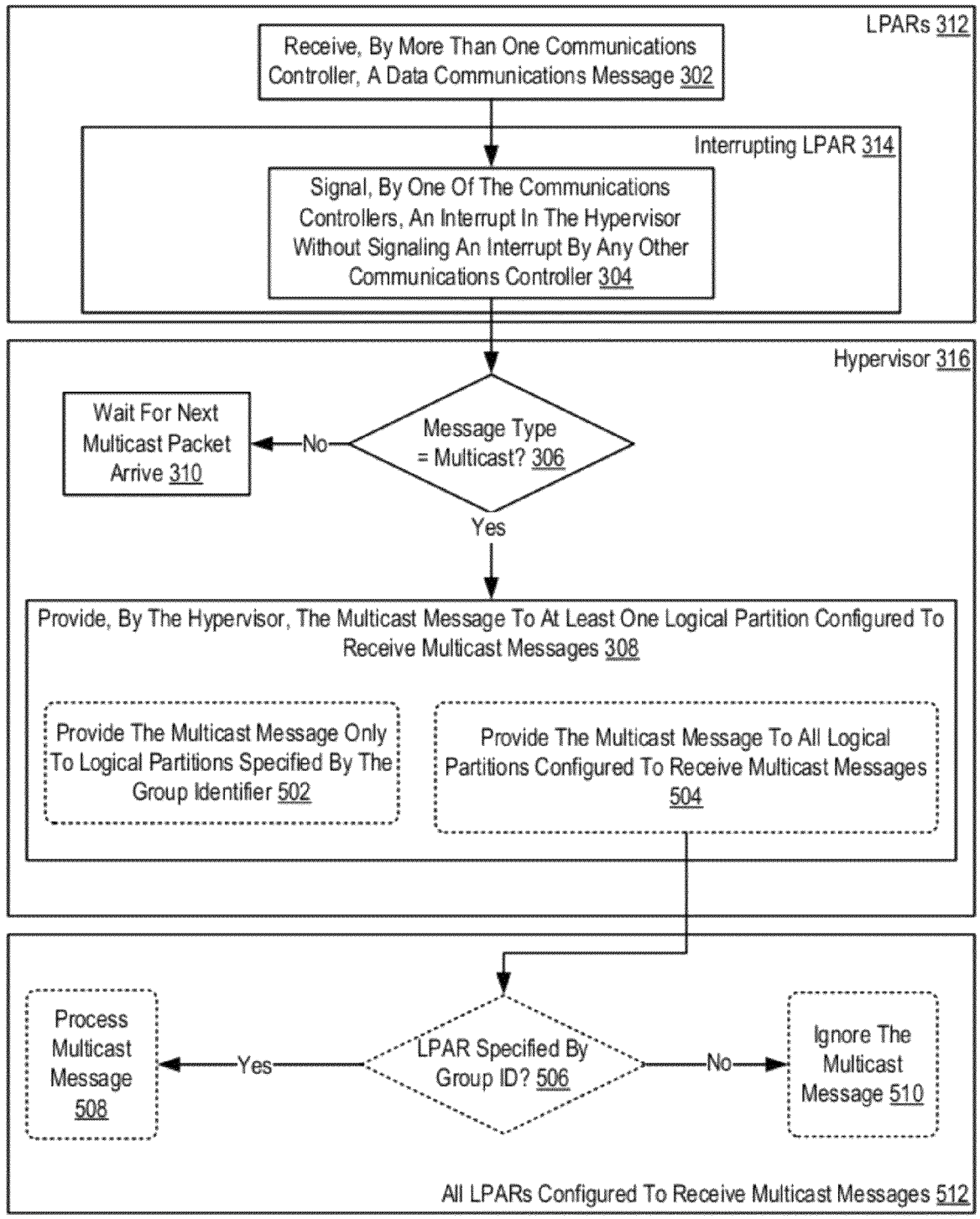
FIG. 5 sets forth a flow chart illustrating a further exemplary method for processing multicast messages in a data processing system according to embodiments of the present invention.

For further explanation, FIG. 5 sets forth a flow chart illustrating a further exemplary method for processing multicast messages in a data processing system according to embodiments of the present invention. The method of FIG. 5 is similar to the method of FIG. 3 in that the method of FIG. 5 also includes: receiving (302), by more than one of the communications controllers, a multicast message; responsive to receipt of the multicast message, signaling (304), by one of the communications controllers, an interrupt in the hypervisor without signaling an interrupt by any other communications controller; determining (306), by the hypervisor, that the message received by the interrupt signaling communications controller is a multicast message; and providing (308), by the hypervisor, the multicast message to at least one logical partition configured to receive multicast messages.

The method of FIG. 5 differs from the method of FIG. 3, however, in that the multicast message includes a group identifier. Such a group identifier specifies a subset of the data processing system's logical partitions intended to receive the multicast message. The method of FIG. 5 includes two alternative ways of providing (308) such a multicast message to at least one logical partition configured to receive multicast messages. In the method of FIG. 5, providing (308) such a multicast message to at least one logical partition may include providing (502), by the hypervisor, the multicast message only to logical partitions specified by the group identifier. That is, in some embodiments, the hypervisor may effectively filter multicast message such that only intended recipients receive the message. In another embodiment depicted in the method of FIG. 5, providing (308) such a multicast message to at least one logical partition is carried out by providing (504) the multicast message to all logical partitions configured to receive multicast messages. and each logical partition separately determines (506) whether the logical partition is specified by the group identifier. In this alternative embodiment, rather than the hypervisor filtering the multicast message by groups, the hypervisor sends the message along to all logical partitions configured to receive such messages and the logical partitions individually and separate filter the messages by groups. A logical partition not specified by the group identifier of such a multicast message, for example, may ignore or drop the message.

Figure 6:
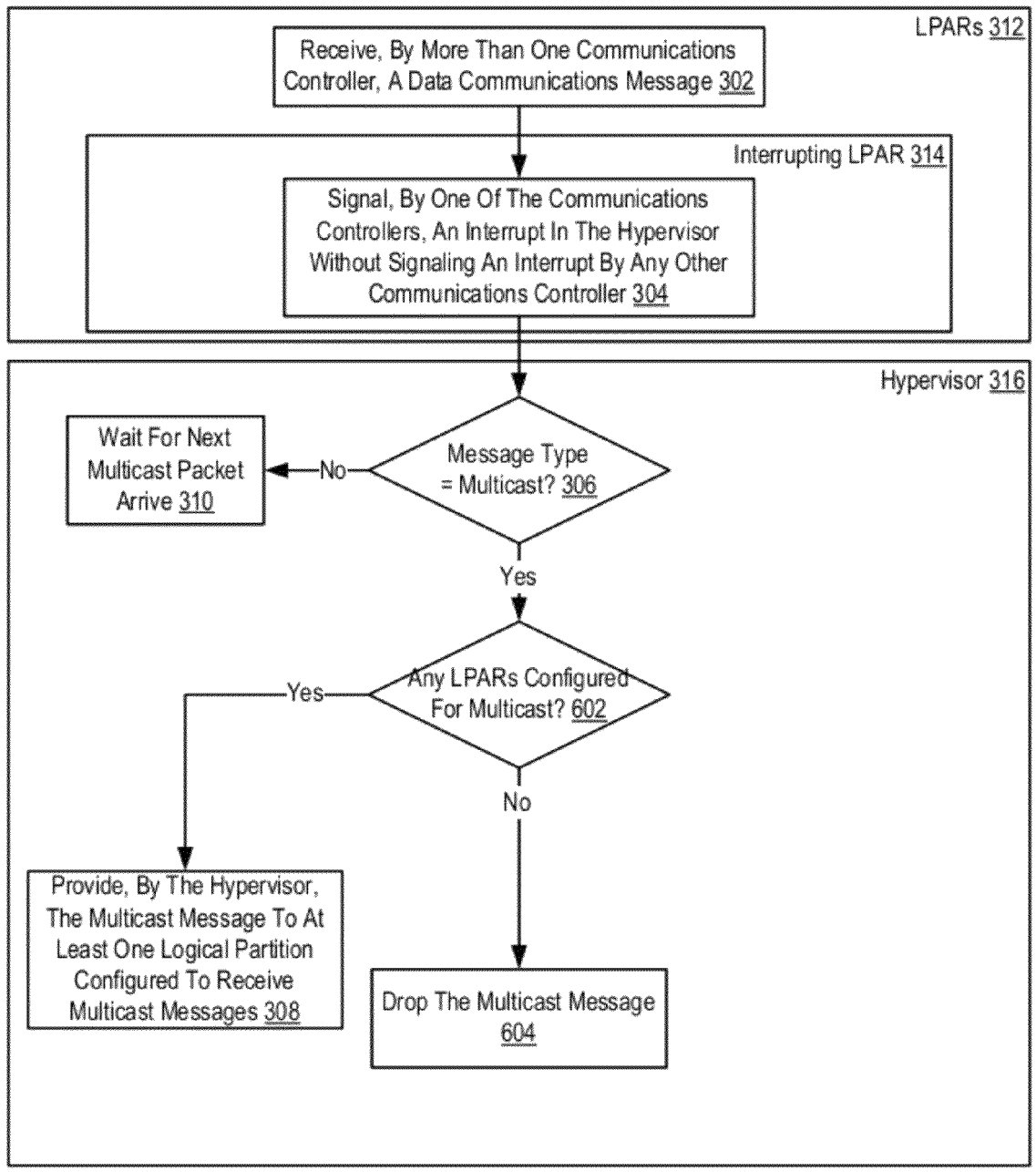
FIG. 6 sets forth a flow chart illustrating a further exemplary method for processing multicast messages in a data processing system according to embodiments of the present invention.

For further explanation, FIG. 6 sets forth a flow chart illustrating a further exemplary method for processing multicast messages in a data processing system according to embodiments of the present invention. The method of FIG. 6 is similar to the method of FIG. 3 in that the method of FIG. 6 also includes: receiving (302), by more than one of the communications controllers, a multicast message; responsive to receipt of the multicast message, signaling (304), by one of the communications controllers, an interrupt in the hypervisor without signaling an interrupt by any other communications controller; determining (306), by the hypervisor, that the message received by the interrupt signaling communications controller is a multicast message; and providing (308), by the hypervisor, the multicast message to at least one logical partition configured to receive multicast messages.

The method of FIG. 5 differs from the method of FIG. 3, however, in that the method of FIG. 5 includes determining (602) whether any logical partitions are configured to receive a multicast message. If no logical partitions are configured to receive a multicast message, the method of FIG. 6 continues by dropping (604), by the hypervisor, the multicast message. From time to time in a data processing system similar to those depicted in FIG. 1 and FIG. 2, no logical partition is configured to receive a multicast message when the communications controllers receive the multicast message. This may occur for various reasons including, for example, receiving the multicast messages prior to full startup of the logical partitions or prior to the logical partitions registering receive queues with the hypervisor. In such embodiments, the hypervisor may be configured to drop (604) the multicast message or flush the multicast message from memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of processing multicast messages in a data processing system, the data processing system comprising a plurality of compute nodes, each compute node comprising a communications controller, the communications controllers operatively coupled for data communications amongst the compute nodes of the data processing system, each compute node in the data processing system executing at least one logical partition, the data processing system further comprising a hypervisor adapting communications controllers of the compute nodes to logical partitions for multicast communications, the method comprising:

receiving, by more than one of the communications controllers, a multicast message;
responsive to receipt of the multicast message, signaling, by one of the communications controllers, an interrupt in the hypervisor without signaling an interrupt by any other communications controller;
determining, by the hypervisor, that the message received by the interrupt signaling communications controller is a multicast message;
and providing, by the hypervisor, the multicast message to at least one logical partition configured to receive multicast messages;

wherein:
the multicast message further comprises a group identifier, the group identifier specifying a subset of the data processing system's logical partitions intended to receive the multicast message;
providing the multicast message to at least one logical partition configured to receive multicast messages further comprises providing the multicast message to all logical partitions configured to receive multicast messages;
and the method further comprises determining, by each logical partition receiving the multicast message, whether the receiving logical partition is specified by the group identifier.

2. The method of claim 1, wherein determining that the message is a multicast message further comprises inspecting a header of the message and identifying in the message header a multicast message type.

3. The method of claim 1, further comprising permitting, by the hypervisor at startup of the data processing system, multicast message interrupts on only one communications controller in the data processing system.

4. The method of claim 1, wherein:
the multicast message further comprises a group identifier, the group identifier specifying a subset of the data processing system's logical partitions intended to receive the multicast message; and
providing the multicast message to at least one logical partition configured to receive multicast messages further comprises providing the multicast message only to logical partitions specified by the group identifier.

5. The method of claim 1, further comprising dropping, by the hypervisor, the multicast message if no logical partition in the data processing system is configured to receive a multicast message.

6. An apparatus for processing multicast messages in a data processing system, the data processing system comprising a plurality of compute nodes, each compute node comprising a communications controller, the communications controllers operatively coupled for data communications amongst the compute nodes of the data processing system, each compute node in the data processing system executing at least one logical partition, the data processing system further comprising a hypervisor adapting communications controllers of the compute nodes to logical partitions for multicast communications, the apparatus comprising a computer processor, a computer memory operatively coupled to the computer processor, the computer memory having disposed within it computer program instructions that, when executed by the computer processor, cause the apparatus to carry out the steps of:
receiving, by more than one of the communications controllers, a multicast message;
responsive to receipt of the multicast message, signaling, by one of the communications controllers, an interrupt in the hypervisor without signaling an interrupt by any other communications controller;
determining, by the hypervisor, that the message received by the interrupt signaling communications controller is a multicast message;
and providing, by the hypervisor, the multicast message to at least one logical partition configured to receive multicast messages;
wherein:
the multicast message further comprises a group identifier, the group identifier specifying a subset of the data processing system's logical partitions intended to receive the multicast message;
providing the multicast message to at least one logical partition configured to receive multicast messages further comprises providing the multicast message to all logical partitions configured to receive multicast messages;
and the apparatus further comprises computer program instructions that, when executed, cause the apparatus to carry out the step of determining, by each logical partition receiving the multicast message, whether the receiving logical partition is specified by the group identifier.

7. The apparatus of claim 6, wherein determining that the message is a multicast message further comprises inspecting a header of the message and identifying in the message header a multicast message type.

8. The apparatus of claim 6, further comprising permitting, by the hypervisor at startup of the data processing system, multicast message interrupts on only one communications controller in the data processing system.

9. The apparatus of claim 6, wherein:
the multicast message further comprises a group identifier, the group identifier specifying a subset of the data processing system's logical partitions intended to receive the multicast message; and
providing the multicast message to at least one logical partition configured to receive multicast messages further comprises providing the multicast message only to logical partitions specified by the group identifier.

10. The apparatus of claim 6, further comprising computer program instructions that, when executed, cause the apparatus to carry out the step of dropping, by the hypervisor, the multicast message if no logical partition in the data processing system is configured to receive a multicast message.

11. A computer program product for processing multicast messages in a data processing system, the data processing system comprising a plurality of compute nodes, each compute node comprising a communications controller, the communications controllers operatively coupled for data communications amongst the compute nodes of the data processing system, each compute node in the data processing system executing at least one logical partition, the data processing system further comprising a hypervisor adapting communications controllers of the compute nodes to logical partitions for multicast communications, the computer program product disposed upon a computer readable medium, wherein the computer readable medium in not a signal, the computer program product comprising computer program instructions that, when executed, cause a computer to carry out the steps of:
receiving, by more than one of the communications controllers, a multicast message;
responsive to receipt of the multicast message, signaling, by one of the communications controllers, an interrupt in the hypervisor without signaling an interrupt by any other communications controller;
determining, by the hypervisor, that the message received by the interrupt signaling communications controller is a multicast message;
and providing, by the hypervisor, the multicast message to at least one logical partition configured to receive multicast messages;
wherein:
the multicast message further comprises a group identifier, the group identifier specifying a subset of the data processing system's logical partitions intended to receive the multicast message;

providing the multicast message to at least one logical partition configured to receive multicast messages further comprises providing the multicast message to all logical partitions configured to receive multicast messages;

and the computer program product further comprises computer program instructions that, when executed, cause the computer to carry out the step of determining, by each logical partition receiving the multicast message, whether the receiving logical partition is specified by the group identifier.

12. The computer program product of claim 11, wherein determining that the message is a multicast message further comprises inspecting a header of the message and identifying in the message header a multicast message type.

13. The computer program product of claim 11, further comprising permitting, by the hypervisor at startup of the data processing system, multicast message interrupts on only one communications controller in the data processing system.

14. The computer program product of claim 11, wherein:
the multicast message further comprises a group identifier, the group identifier specifying a subset of the data processing system's logical partitions intended to receive the multicast message; and providing the multicast message to at least one logical partition configured to receive multicast messages further comprises providing the multicast message only to logical partitions specified by the group identifier.

15. The computer program product of claim 11, further comprising computer program instructions that, when executed, cause the computer to carry out the step of dropping, by the hypervisor, the multicast message if no logical partition in the data processing system is configured to receive a multicast message.

16. The computer program product of claim 11 wherein the computer readable medium comprises a recordable medium.

* * * * *